United States Patent
Zeng

(10) Patent No.: US 12,343,590 B1
(45) Date of Patent: Jul. 1, 2025

(54) WALKING/TREADMILL WITH INTEGRATED BASE AND MANUFACTURING METHOD FOR THE INTEGRATED BASE

(71) Applicant: Piao Zeng, Yangjiang (CN)

(72) Inventor: Piao Zeng, Yangjiang (CN)

( * ) Notice: Subject to any disclaimer, the term of this patent is extended or adjusted under 35 U.S.C. 154(b) by 0 days.

(21) Appl. No.: 19/006,361

(22) Filed: Dec. 31, 2024

(30) Foreign Application Priority Data

Feb. 16, 2024 (CN) .......................... 202410178859.5
Dec. 24, 2024 (CN) .......................... 202411915146.9

(51) Int. Cl.
*A63B 22/02* (2006.01)
*C08J 5/04* (2006.01)

(52) U.S. Cl.
CPC ........ *A63B 22/0285* (2013.01); *A63B 22/025* (2015.10); *C08J 5/043* (2013.01); *A63B 2209/026* (2013.01)

(58) Field of Classification Search
CPC .............. A63B 22/0285; A63B 22/025; A63B 2209/026; A63B 22/0235; A63B 2209/08; A63B 2225/055; A63B 2225/09; A63B 21/00192; A63B 21/0089; A63B 21/012; A63B 21/4015; A63B 22/0023; A63B 22/0242; A63B 71/0009; A63B 2208/0204; A63B 2209/00; A63B 2209/10; A63B 2225/05; A63B 22/02; A63B 2022/206; C08J 5/043; A43B 1/0054; A43B 1/0081; A43B 5/06; A43B 5/18; A43B 13/122; A43B 13/22
See application file for complete search history.

(56) References Cited

U.S. PATENT DOCUMENTS

| | | | | | |
|---|---|---|---|---|---|
| 4,616,822 | A | * | 10/1986 | Trulaske | A63B 22/02 198/841 |
| 5,709,632 | A | * | 1/1998 | Socwell | A63B 22/02 482/54 |
| 5,897,461 | A | * | 4/1999 | Socwell | A63B 22/02 482/54 |
| 6,042,514 | A | * | 3/2000 | Abelbeck | A63B 22/02 482/54 |
| 6,045,489 | A | * | 4/2000 | Levine | A63B 22/205 482/130 |
| 6,095,951 | A | * | 8/2000 | Skowronski | A63B 22/0023 482/54 |

(Continued)

*Primary Examiner* — Garrett K Atkinson
(74) *Attorney, Agent, or Firm* — JEEN IP LAW, LLC

(57) ABSTRACT

A walking/treadmill with an integrated base and a manufacturing method for the integrated base are provided. The walking/treadmill with an integrated base includes an integrated base, a running board, a running belt, a motor, an electric control, and a drum. The integrated base is provided with an installation part configured to install the running board, the running belt, the motor, the electric control, and the drum. The base includes a transverse beam, a longitudinal beam, and an installation cavity shell provided between the transverse beam and the longitudinal beam. The transverse beam, the longitudinal beam, and the installation cavity shell are all made of reinforced plastic and are integrally injection molded. The present disclosure has advantages of simple production, high structural strength, and overall lightweight, thereby reducing logistics costs.

9 Claims, 9 Drawing Sheets

(56) References Cited

U.S. PATENT DOCUMENTS

| | | | |
|---|---|---|---|
| 6,561,953 B1* | 5/2003 | Chang | A63B 22/0235 |
| | | | 482/54 |
| 6,964,632 B1* | 11/2005 | Ko | A63B 22/0023 |
| | | | 482/54 |
| 10,010,748 B1* | 7/2018 | Weinstein | A63B 22/0285 |
| 10,058,730 B2* | 8/2018 | Athey | A63B 22/0228 |
| 11,877,655 B1* | 1/2024 | Stewart | A63B 22/02 |
| 2003/0199366 A1* | 10/2003 | Anderson | A63B 22/0242 |
| | | | 482/54 |
| 2005/0148441 A1* | 7/2005 | Dyer | A63B 22/0235 |
| | | | 482/54 |
| 2019/0060705 A1* | 2/2019 | Yoo | A63B 22/0285 |
| 2021/0283465 A1* | 9/2021 | Arceta | A63B 71/0622 |

* cited by examiner

WALKING/TREADMILL WITH INTEGRATED BASE AND MANUFACTURING METHOD FOR THE INTEGRATED BASE

CROSS-REFERENCE TO RELATED APPLICATIONS

This application claims priority to Chinese Patent Application No. 202410178859.5, filed on Feb. 16, 2024, and Chinese Patent Application No. 202411915146.9, filed on Dec. 24, 2024. Both of which are hereby incorporated by reference in their entireties.

TECHNICAL FIELD

The present disclosure relates to the field of treadmill technologies, and in particular, to a walking/treadmill with an integrated base and a manufacturing method for the integrated base.

BACKGROUND

The existing treadmill (or walking machine) consists of a main frame as a base, a running platform installed on the main frame, armrests, and a control platform. The running platform is fixed parallel to the base, thereby forming a walking or running exercise plane.

The main frame of the existing treadmill base is usually composed of two metal transverse beams and a longitudinal beam connecting the two transverse beams, they are connected by welding technology.

An assembly process of the base connected by welding technology is complex and requires welding workers to have proficient welding skills; furthermore, the different welding levels have also hindered the automation and standardization of base production. Therefore, it is necessary to design a manufacturing method for an integrated walking machine/treadmill base to solve the above problems.

SUMMARY

To address the shortcomings of existing technology, a walking/treadmill with a simple and structurally strong integrated base is provided.

The present disclosure is implemented using the following technical solution: a walking/treadmill with an integrated base, including an integrated base, a running board, a running belt, a motor, an electric control, and a drum; the integrated base is provided with an installation part configured to install the running board, the running belt, the motor, the electric control, and the drum; the base includes a transverse beam, a longitudinal beam, and an installation cavity shell provided between the transverse beam and the longitudinal beam; the longitudinal beam and the installation cavity shell are both made of reinforced plastic with a predetermined mixing ratio and are integrally injection molded.

Where, at least the longitudinal beam and the installation cavity shell are both made of reinforced plastic and are integrally injection molded. This means that the transverse beam can be injection molded with the longitudinal beam and the installation cavity shell, and the transverse beam can also be manufactured separately. For example, the transverse beam can be installed on the longitudinal beam through steel or aluminum alloy materials.

The above scheme uses reinforced plastic and integrated injection molding for the transverse beam, longitudinal beam, and installation cavity shell of the base. Compared with existing welding processes, it is simpler to manufacture and assemble, and can be manufactured on a large scale with high production efficiency. The base material is made of plastic, which has advantages of low cost, light weight, and easy to transport and convey. By designing the walking/treadmill base as an integrated molding structure, the disadvantages of the complex structure of existing walking/treadmill bases are overcome, thereby eliminating a high production cost of welding and assembly, reducing environmental pollution, and requiring low skills for workers. It has the advantages of simple assembly and low manufacturing cost.

In some embodiments of the present disclosure, the reinforced plastic includes polypropylene and glass fiber, or polyamide-6 and glass fiber, or polyamide-66 and glass fiber; the glass fiber includes continuous glass fiber and staple glass fiber.

The glass fiber is added to plastic materials such as polypropylene, polyamide-6, or polyamide-66 to improve the overall toughness of the plastic and enhance the toughness of the base.

In some embodiments of the present disclosure, the reinforced plastic with a predetermined mixing ratio refers to a weight percentage of the glass fiber is more than or equal to 15%, and the reinforced plastic has at least one of the following characteristics: a tensile strength of the reinforced plastic measured according to a tensile performance testing method for plastics is greater than or equal to 50 Mpa; a bending strength of the reinforced plastic measured according to a bending performance testing method for plastics is greater than or equal to 80 Mpa; a notch impact strength of a cantilever beam of the reinforced plastic measured according to an Izod impact strength testing method for plastics is greater than or equal to 8 $KJ/m^2$.

In some embodiments of the present disclosure, the reinforced plastic includes polyolefin and reinforcing filler, or polyamide and reinforcing filler; where the reinforcing filler includes one or more of a group of glass fiber, talc powder, calcium carbonate, barium sulfate, wollastonite, and whiskers.

By mixing the reinforcing filler into the plastic of polyolefin or polyamide, the rigidity of the plastic can be reduced to enhance the rigidity of the base.

In some embodiments of the present disclosure, the reinforced plastic with a predetermined mixing ratio refers to a weight percentage of the reinforcing filler is more than or equal to 5%, and the reinforced plastic has at least one of the following characteristics: a bending strength of the reinforced plastic measured according to a bending performance testing method for plastics is greater than or equal to 25 Mpa; a notch impact strength of a cantilever beam of the reinforced plastic measured according to an Izod impact strength testing method for plastics is greater than or equal to 3 $KJ/m^2$.

In some embodiments of the present disclosure, the reinforced plastic is obtained by mixing acrylonitrile-butadiene-styrene copolymer and polycarbonate or mixing acrylonitrile-butadiene-styrene copolymer and polycarbonate in a predetermined ratio.

In some embodiments of the present disclosure, the reinforced plastic includes acrylonitrile-butadiene-styrene copolymer, or acrylonitrile-butadiene-styrene copolymer and polycarbonate; the reinforced plastic with a predetermined mixing ratio using a mixture of the acrylonitrile-butadienestyrene copolymer and the polycarbonate refers to a weight proportion of the polycarbonate is more than or equal to 30%, and the reinforced plastic has at least one of the following characteristics: a tensile strength of the reinforced plastic measured according to a tensile performance testing method for plastics is greater than or equal to 50 Mpa, a bending strength of the reinforced plastic measured according to a bending performance testing method for plastics is greater than or equal to 70 Mpa; a charpy notch impact strength of the reinforced plastic measured according to an impact resistance testing method for plastics is greater than or equal to 30 KJ/m$^2$.

In some embodiments of the present disclosure, the longitudinal beam is wrapped with a metal reinforcement member that is extended along a length direction of the longitudinal beam; where the metal reinforcement member is provided with a plurality of through holes that are spaced along a length direction of the metal reinforcement member and penetrate a wall of the metal reinforcement member; the metal reinforcement member is provided with a plurality of convex strips or protrusions that are concave inward from one side of the wall of the metal reinforcement member and convex outward from the other side thereof.

The strength of the longitudinal beam can be further enhanced through the metal reinforcement member, thereby strengthening the strength of the entire base. The metal reinforcement member can be made of iron, steel, or aluminum alloy material. Wrapping the metal reinforcement member around the longitudinal beam refers to placing the metal reinforcement member into a die during injection molding of the longitudinal beam. By providing the through holes, convex strips, and protrusions, the metal reinforcement member is embedded more firmly in the longitudinal beam and has a tight contact with the longitudinal beam.

In some embodiments of the present disclosure, the longitudinal beam and the transverse beam are both provided with reinforcing ribs that are integrally formed with the transverse beam and the longitudinal beam, where the longitudinal beam and the transverse beam are integrally injection molded with the same reinforcing plastic.

By providing the reinforcing ribs, the strength of the transverse beam and the longitudinal beam can be further enhanced, thereby strengthening the overall strength of the base. At the same time, the reinforcing ribs can reduce the weight of the entire base while ensuring the strength with a certain level. The reinforcing ribs are formed during integral injection molding.

A manufacturing method for the integrated base, including the following steps:
- S1: mixing and heating the reinforced plastic according to proportions and performing a granulation treatment with a granulator;
- S2: heating and melting plastic particles and injecting them into a locked injection die by an injection molding machine;
- S3: after completing the injecting of the plastic particles, maintaining a pressure;
- S4: cooling the injection die to solidify a melt within a mould cavity of the injection die into the base;
- S5: after cooling to room temperature, opening the injection die and demolding the base.

In some embodiments of the present disclosure, in step S2, before injecting plastic particles into an injection die by an injection molding machine, the metal reinforcement member is placed in the mould cavity of the injection die corresponding to the transverse beam.

The metal reinforcement member is placed in the mould cavity of the injection die corresponding to the longitudinal beam, so that the plastic material can wrap around the metal reinforcement member with good strength; and there is no need for further processing, which is more convenient.

In the above scheme, the reinforced plastics are mixed according to proportions, which means that each reinforced plastic is proportioned according to its own proportion. For example, if the reinforced plastic is a mixture of polypropylene and glass fiber, the glass fiber is 15% and the polypropylene is 85%. The reinforced plastics can be a mixture of polypropylene and glass fiber, a mixture of polyamide-6 or polyamide-66 and glass fiber, a mixture of acrylonitrile-butadiene-styrene copolymer and polycarbonate, or only the acrylonitrile-butadiene-styrene copolymer. The metal reinforcement member is placed in the mould cavity of the injection die corresponding to the longitudinal beam, so that the reinforced plastic can wrap around the metal reinforcement member with good strength; and there is no need for further processing, which is more convenient.

Compared with existing technologies, the present disclosure has advantages of simple manufacturing and assembly compared to existing welding processes, can be integrated manufactured in large scales, with high production efficiency, lower cost of using plastic materials for the base material, light weight, and convenient to transport and convey. By designing the walking/treadmill base as an integrated molding structure, the disadvantages of the complex structure of existing walking/treadmill bases are overcome, and thereby eliminating a high production cost of welding and assembly, reducing environmental pollution, and requiring low skills for works. It has the advantages of simple assembly and low manufacturing cost.

NUMERAL REFERENCE

1—base; 11—longitudinal beam; 12—transverse beam; 13—installation cavity shell; 21—cover shell; 22—running belt; 23—side board; 24—running board; 25—drum; 26. motor; 27—electric control; 3—metal reinforcement member; 31—through hole; 32—convex strip; 33—protrusion; 4—reinforcing rib.

DESCRIPTION OF EMBODIMENTS

The present disclosure will be further described based on the accompanying drawings and specific embodiments.

Example 1

Figure 1:
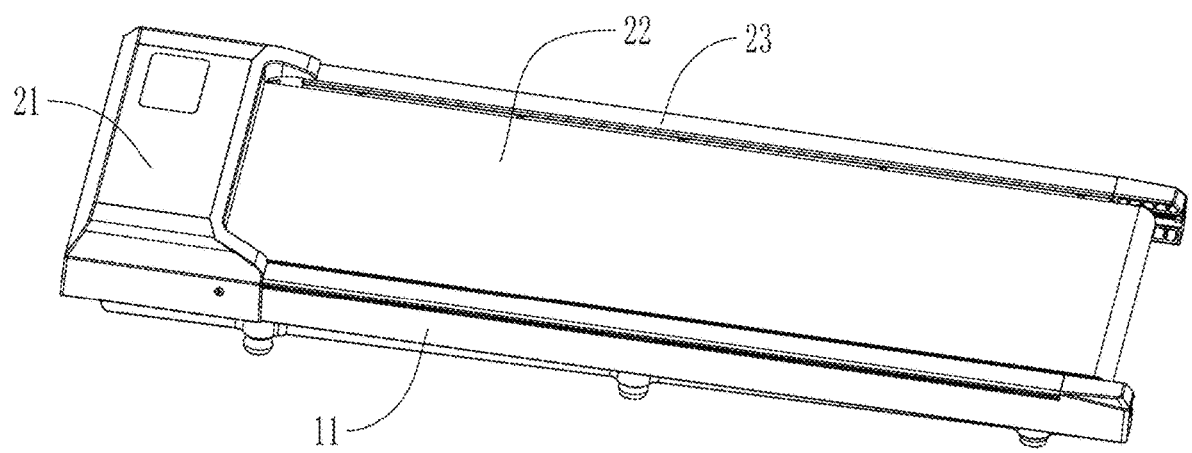
FIG. 1 is a schematic structural diagram of the present disclosure.
Figure 2:
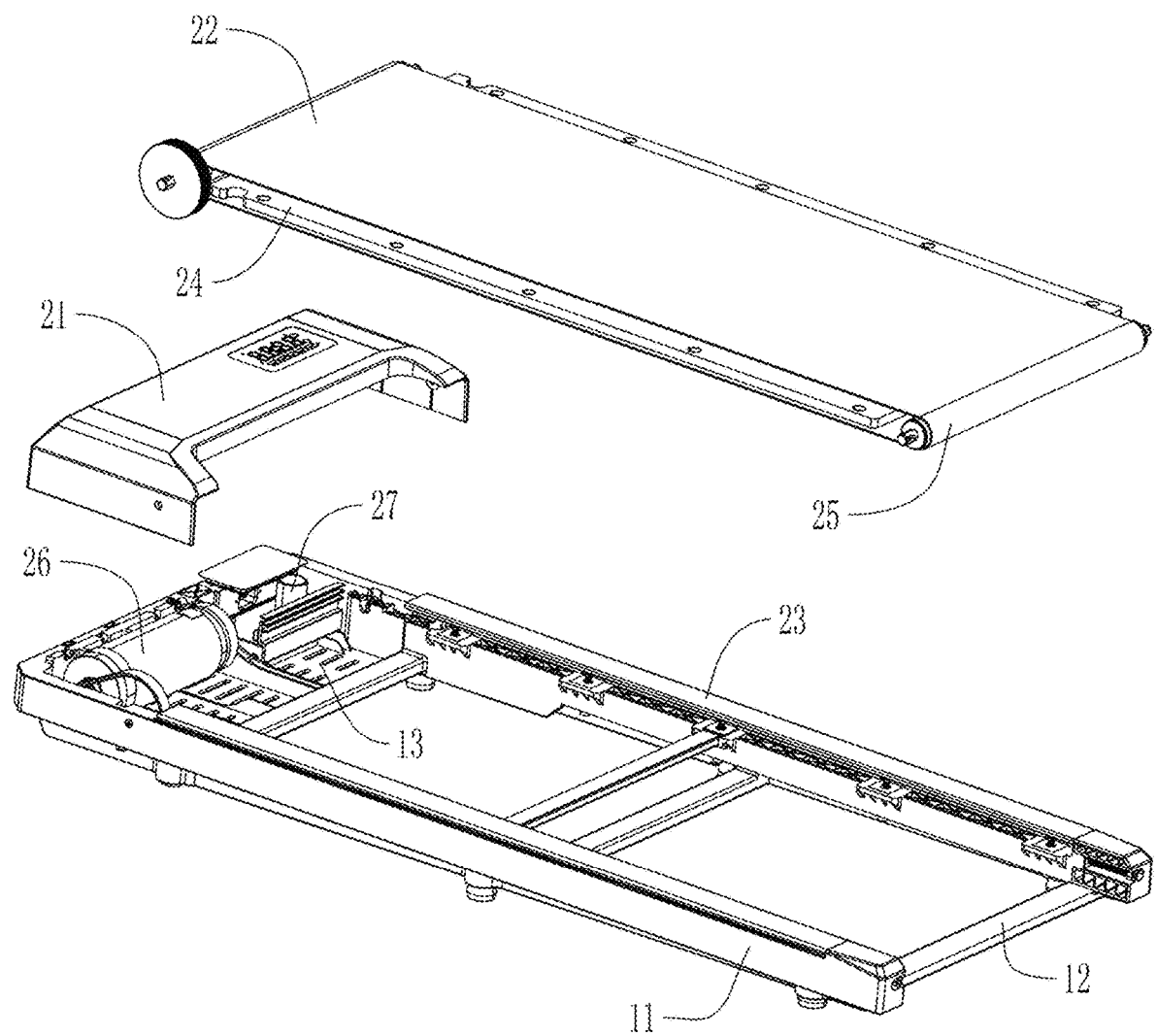
FIG. 2 is an exploded view of FIG. 1.
Figure 3:
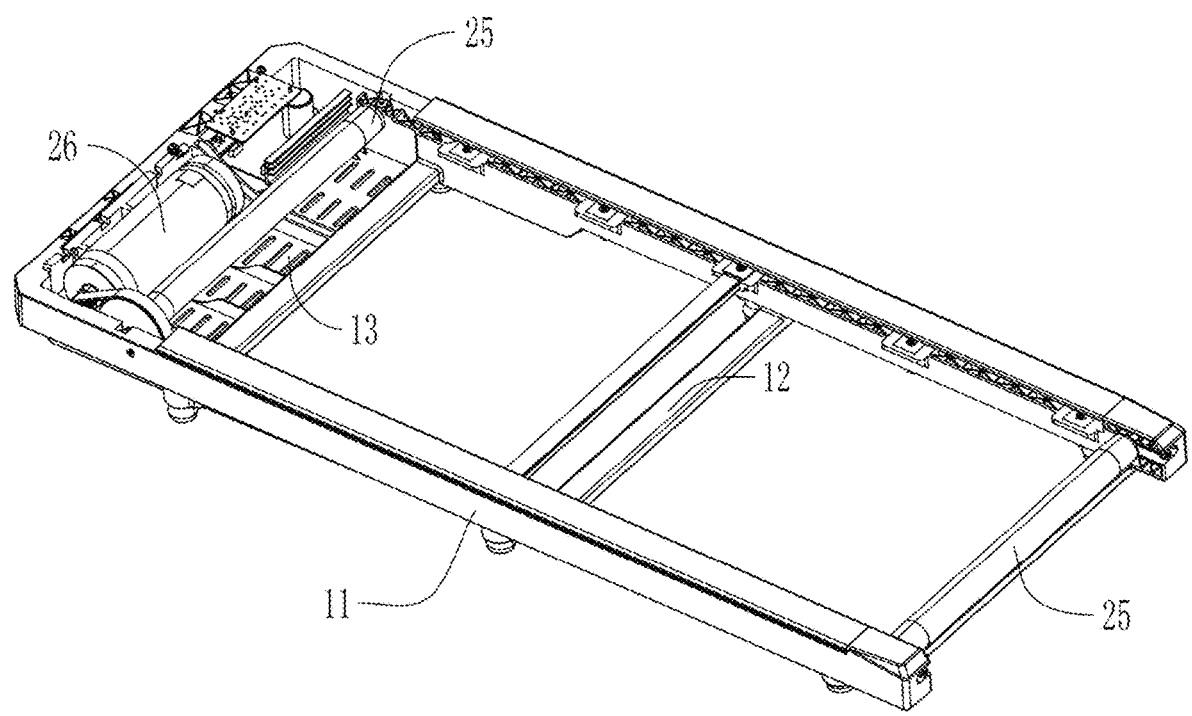
FIG. 3 is a schematic structural diagram after removing a cover shell and a running belt.
Figure 4:
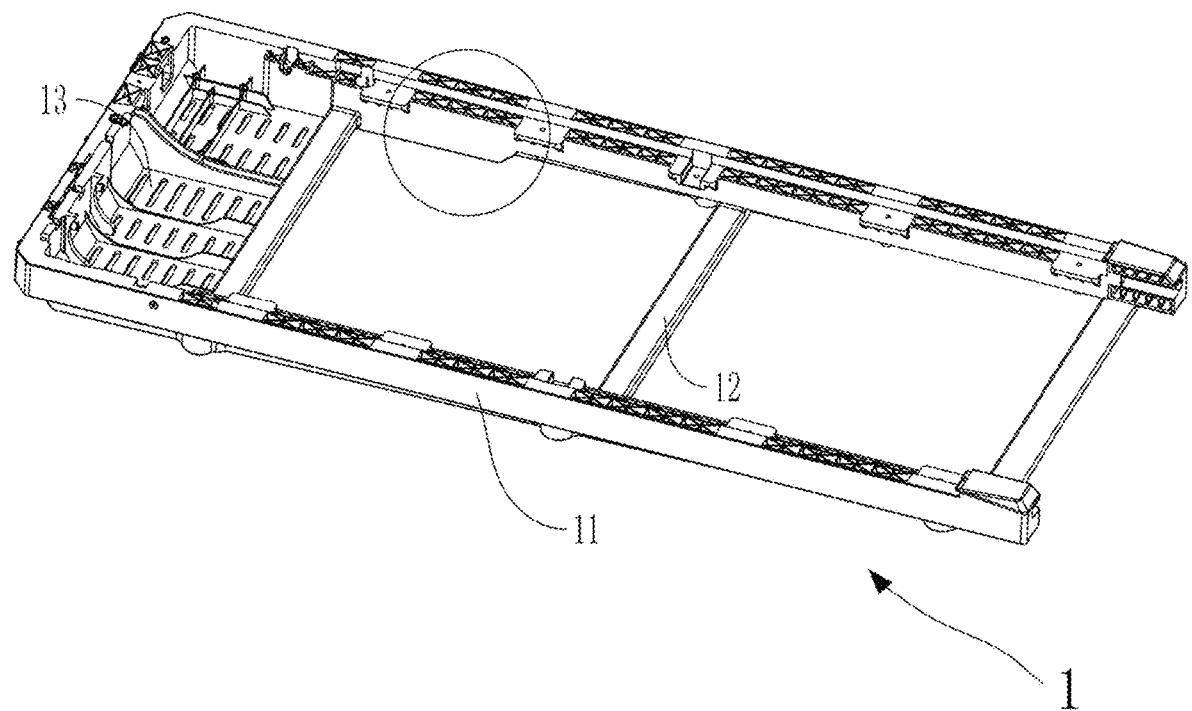
FIG. 4 is a schematic structural diagram of a base.
Figure 5:
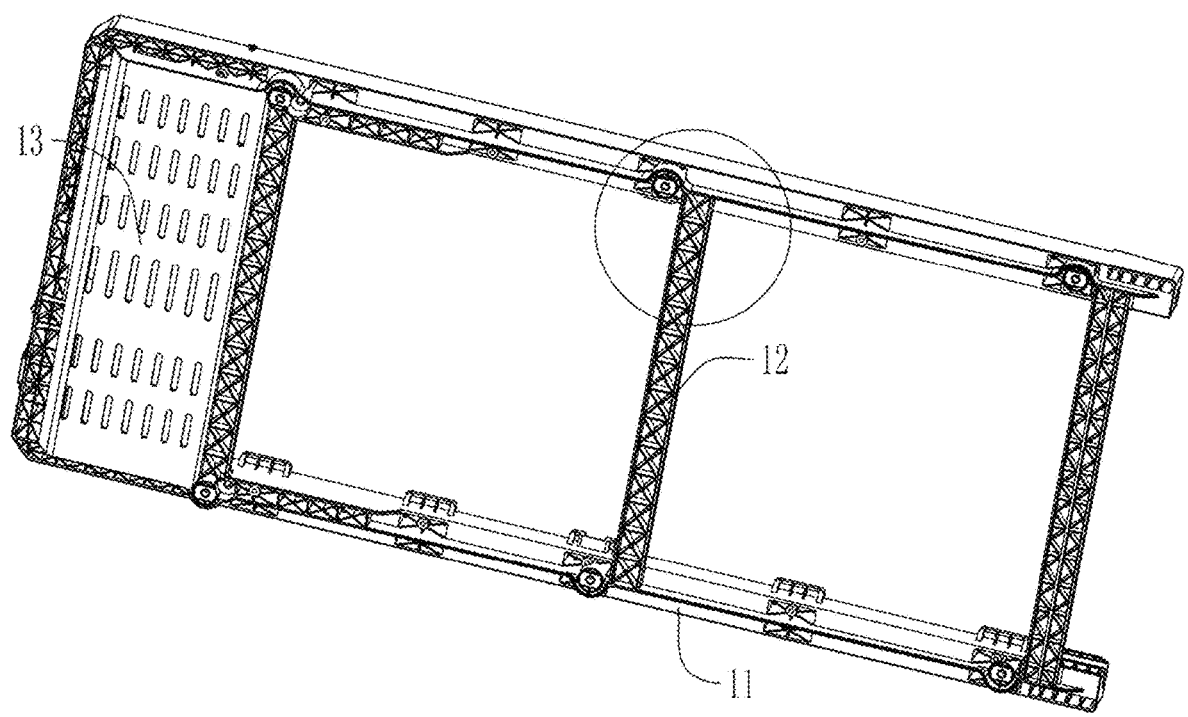
FIG. 5 is a schematic structural diagram below the base.
Figure 6:
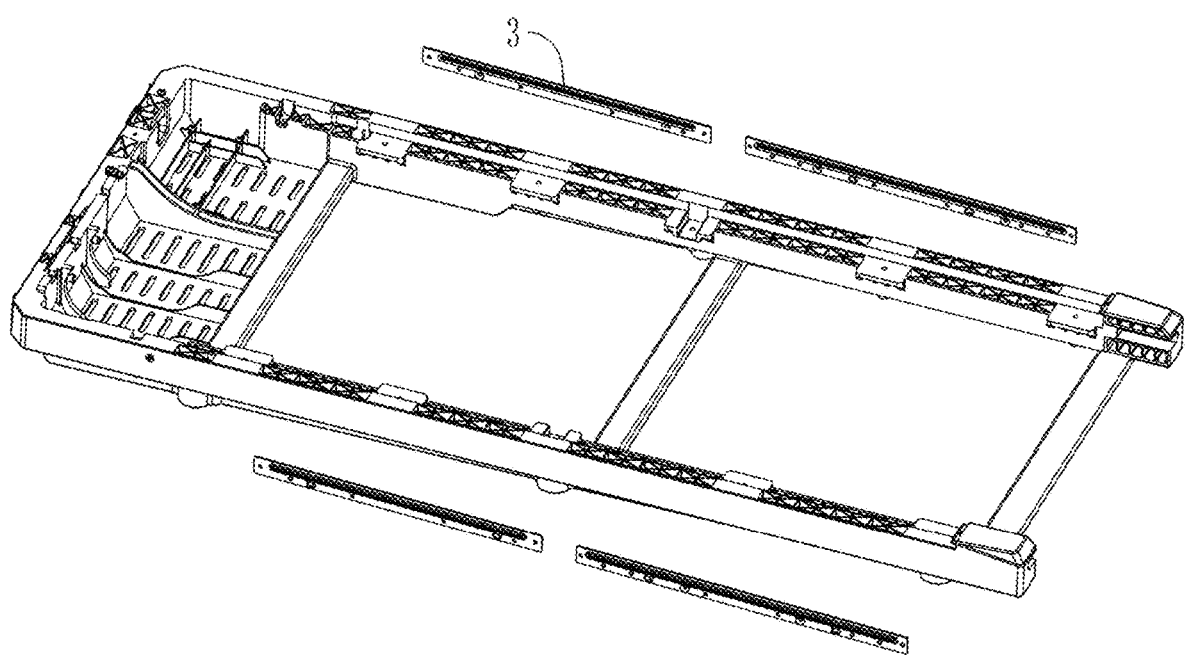
FIG. 6 is a schematic structural diagram of the base and a metal reinforcement member.
Figure 7:
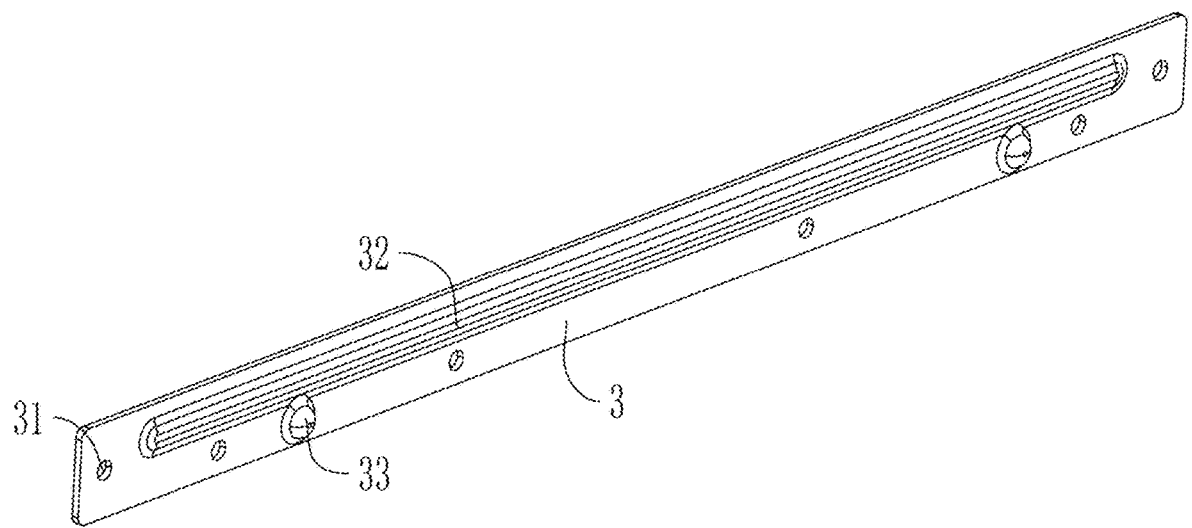
FIG. 7 is a schematic structural diagram of the metal reinforcement member.
Figure 8:
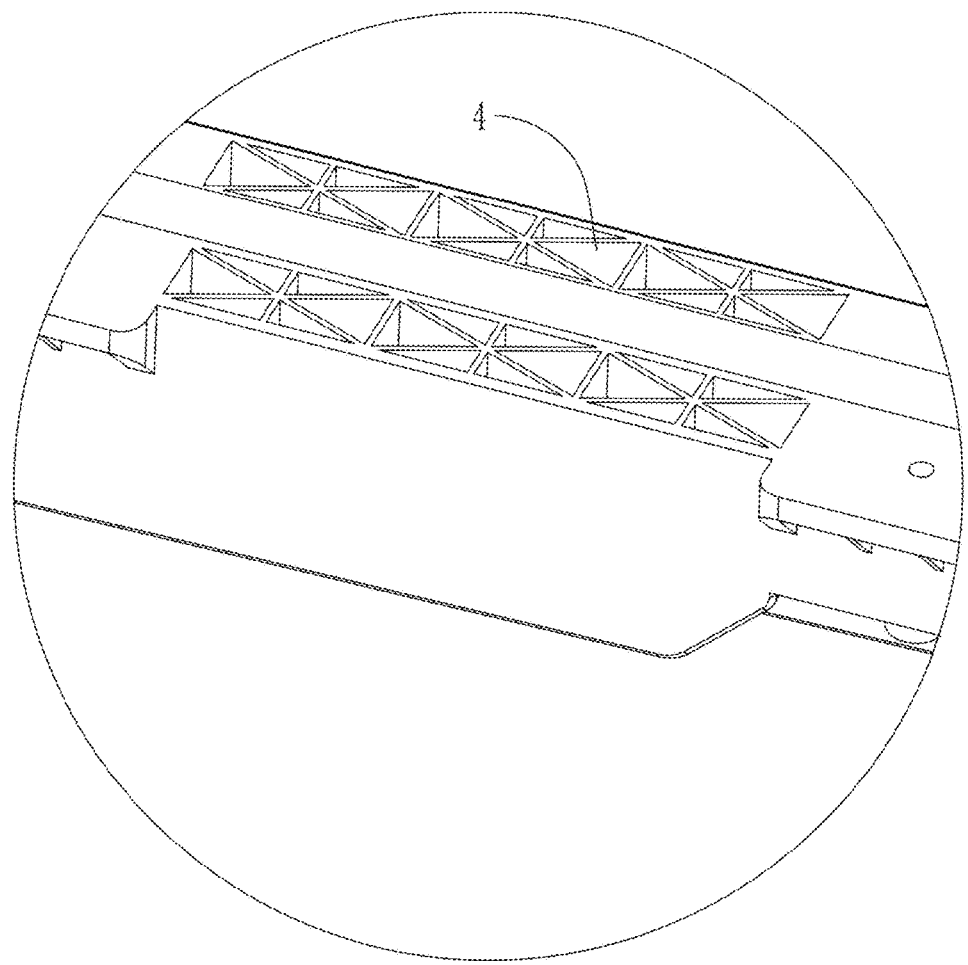
FIG. 8 is an enlarged view of a reinforcing rib at a longitudinal beam.
Figure 9:
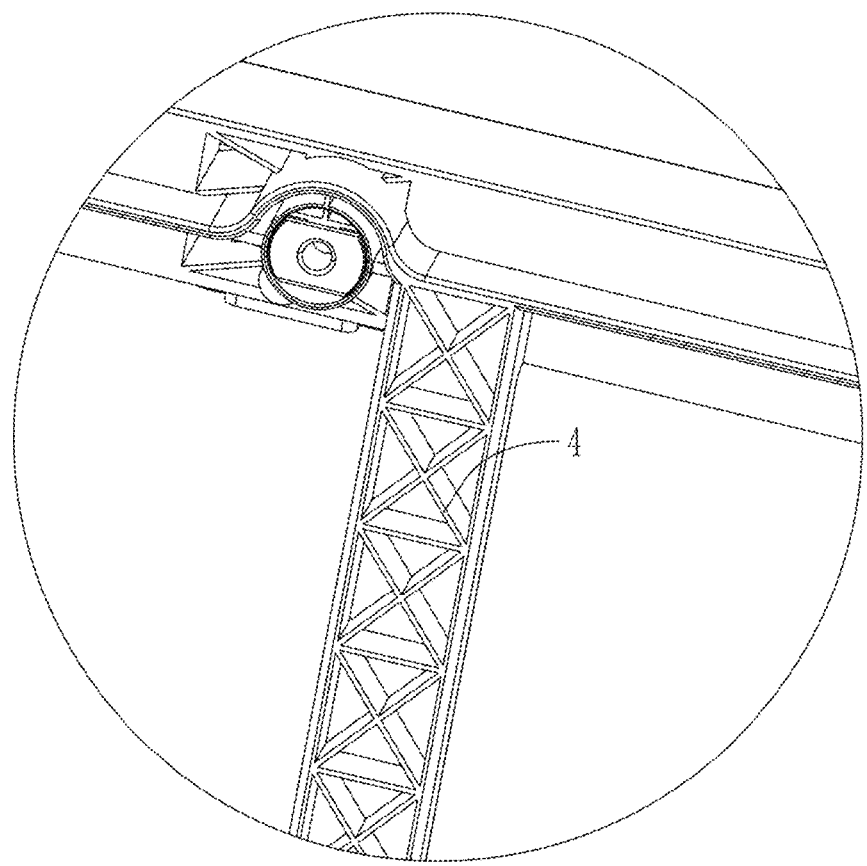
FIG. 9 is an enlarged view of a reinforcing rib at a transverse beam.
Figure 10:
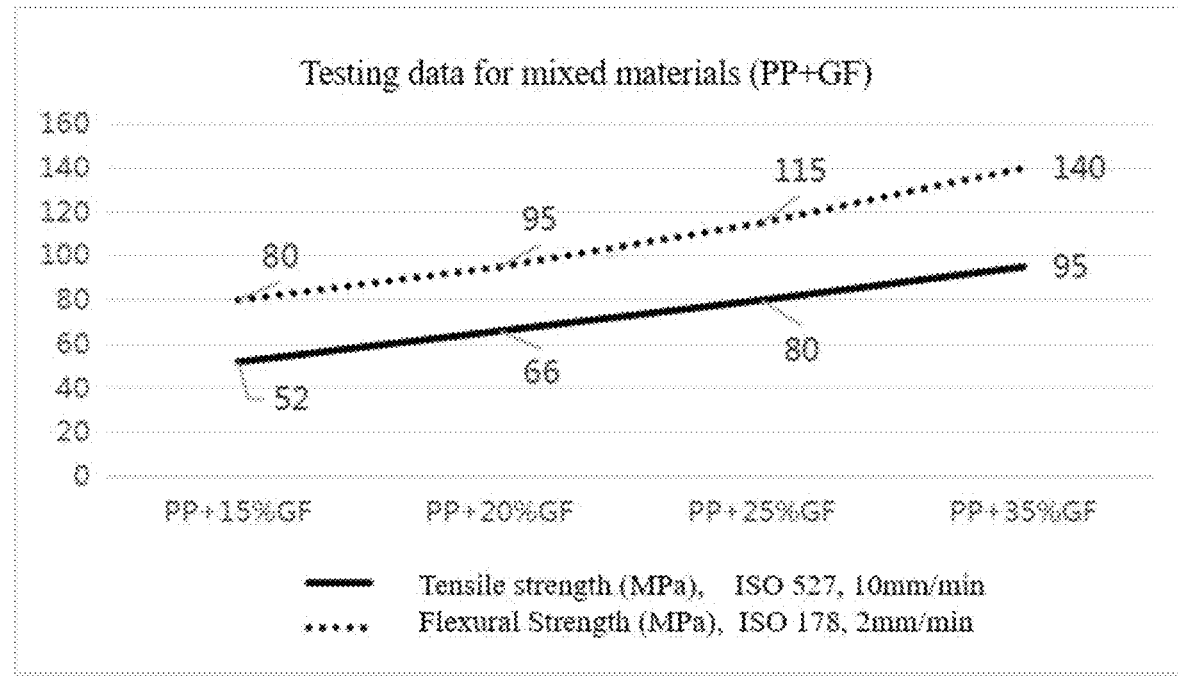
FIG. 10 shows testing data for mixed materials of PP and GF.
Figure 11:
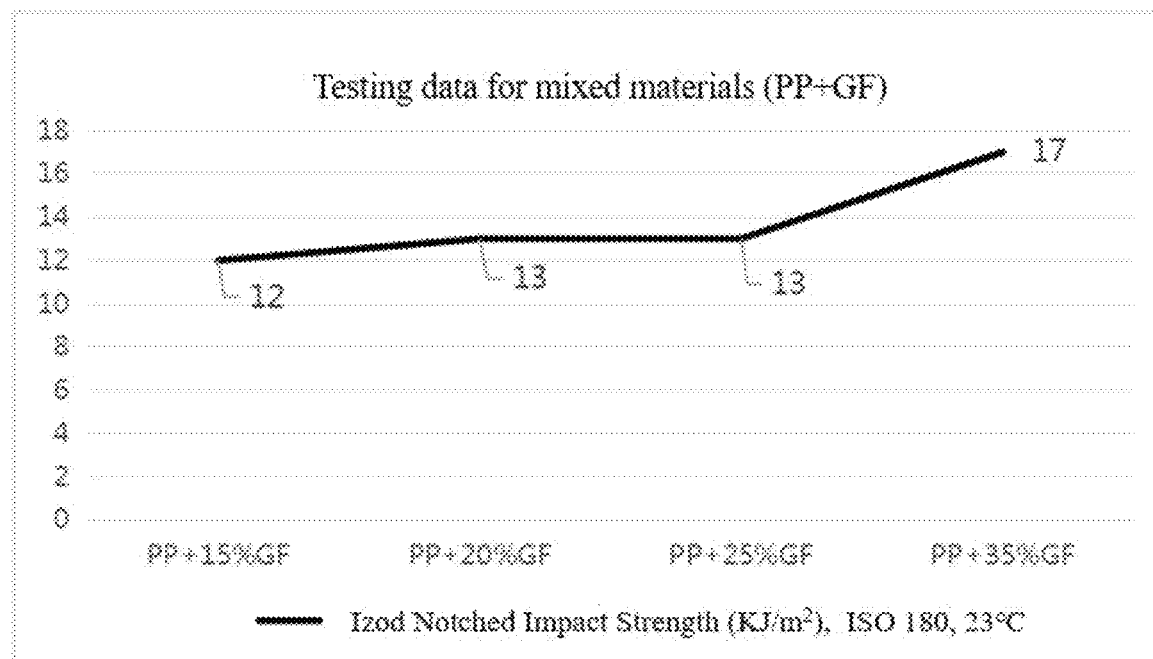
FIG. 11 shows the testing data for mixed materials of PP and GF.
Figure 12:
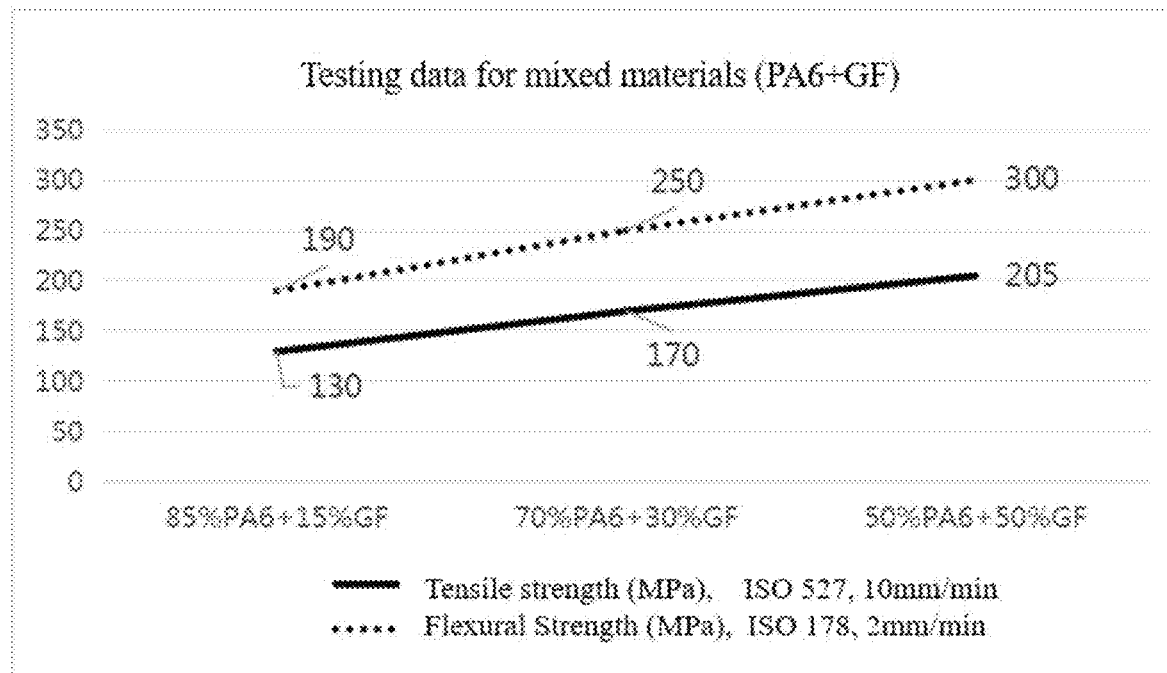
FIG. 12 shows testing data for mixed materials of PA6 and GF.
Figure 13:
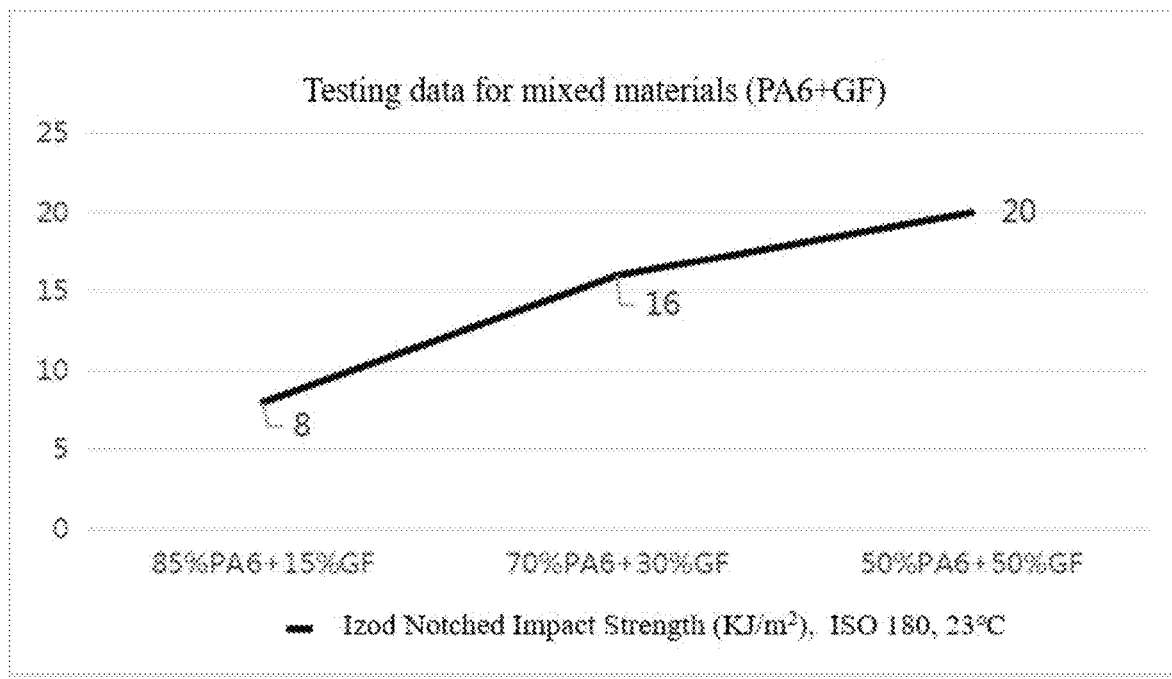
FIG. 13 shows the testing data for mixed materials of PA6 and GF.
Figure 14:
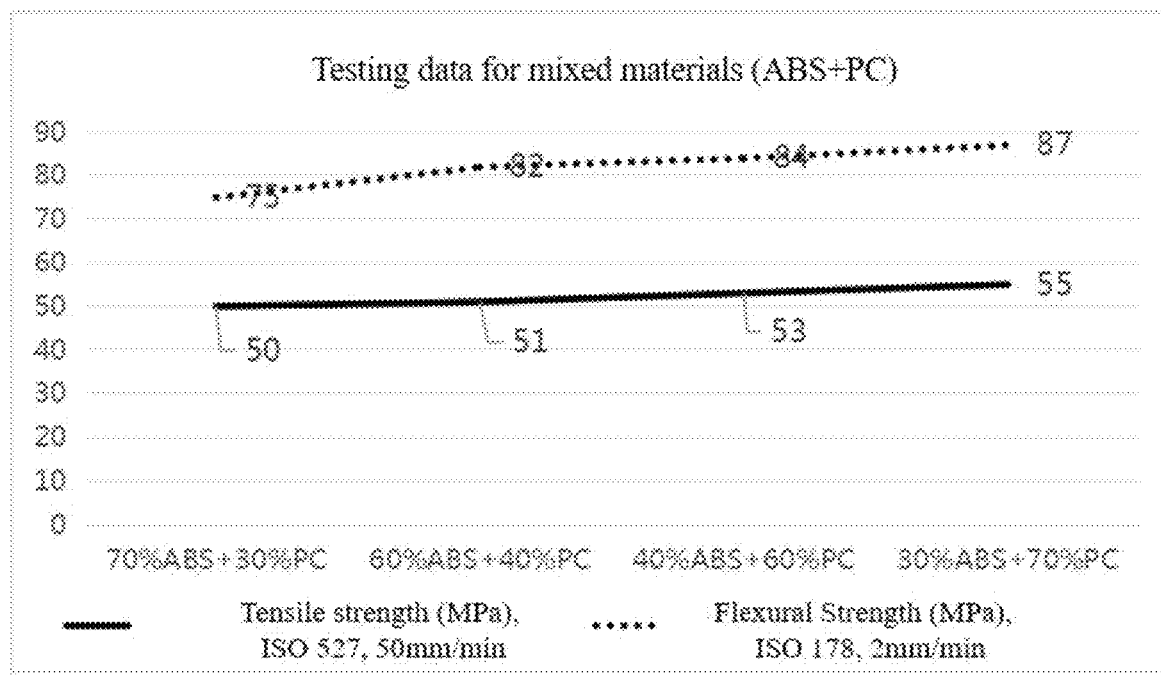
FIG. 14 shows testing data for mixed materials of ABS and PC.
Figure 15:
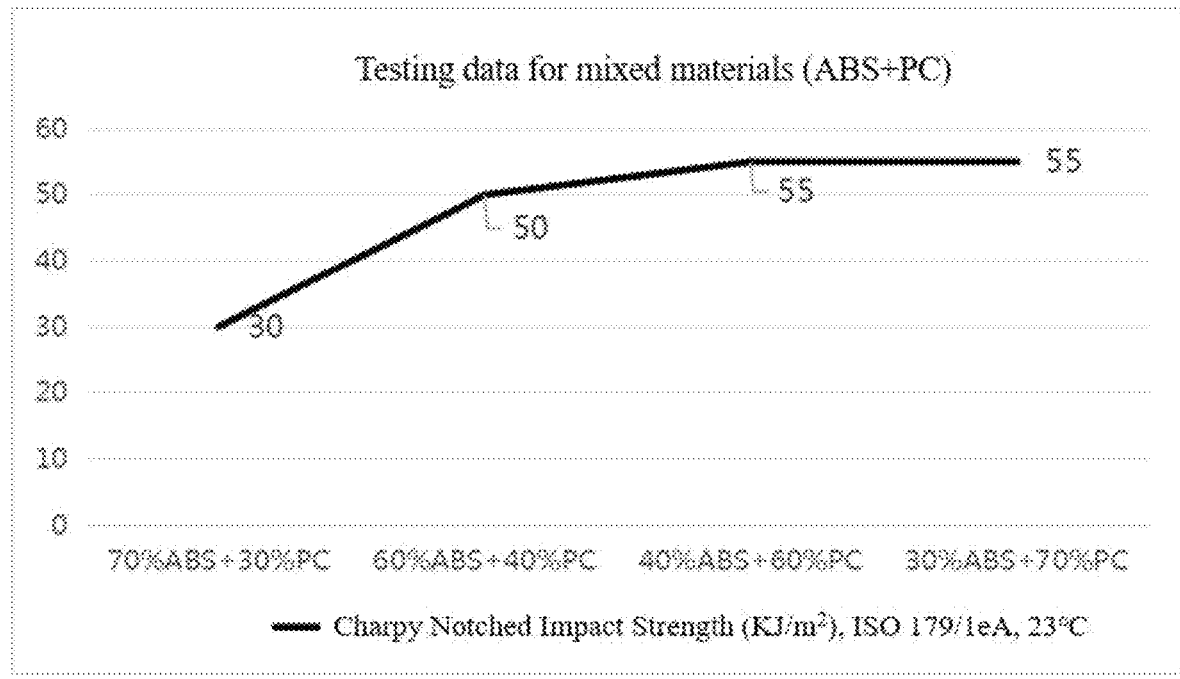
FIG. 15 shows testing data for mixed materials.

As shown in FIGS. 1 to 8, Example 1 discloses a walking/treadmill with an integrated base 1, which includes a running board 24, a running belt 22, a motor 26, an electric control 27, and a drum 25. The integrated base 1 is provided with an installation part configured to install the running board 24, the running belt 22, the motor 26, the electric control 27, and the drum 25. The base 1 includes a transverse beam 12, a longitudinal beam 11, and an installation cavity shell 13 provided between the transverse beam 12 and the longitudinal beam 11. A cover shell 21 is provided above the installation cavity shell 13. The transverse beam 12, the longitudinal beam 11, and installation cavity shell 13 are all made of reinforced plastic and are integrally injection molded. A position of the installation cavity shell 13 is used to install the motor 26 and the electronic control 27; the drum 25 is provided on two sides of the longitudinal beam 11 in a length direction; the running board 24 and the running belt 22 are provided between the longitudinal beam 11 and located above the transverse beam 12. There is also a side board 23 on the longitudinal beam 11. The longitudinal beam 11 and the transverse beam 12 are arranged vertically, and the longitudinal beam 11 is wrapped with a metal reinforcement member 3 extending along a length direction of the longitudinal beam 11. The metal reinforcement member 3 is made of iron material. The metal reinforcement member 3 is provided with a plurality of through holes 31 that are spaced along its length and penetrate a wall of the metal reinforcement member 3. The metal reinforcement member 3 is provided with a convex strip 32 or a protrusion 33 that is concave inward from one side of the wall of the metal reinforcement member 3 and protruded outward from the other side thereof. The number of the protrusion 33 is two; the number of the convex strip 32 is one and the convex strip 32 is extended along the length direction of the metal reinforcement member 3. The transverse beam 12 and the longitudinal beam 11 are both densely covered with reinforcing ribs 4 along longitudinal directions, which are X-shaped and connected to each other. The reinforcing ribs 4 are injection molded together with the transverse beam 12 and the longitudinal beam 11.

The reinforced plastic for the base 1 is a mixture of polypropylene (PP) and glass fiber (GF). The glass fiber is composed of continuous glass fiber and staple glass fiber; a weight percentage of the glass fiber is 15% to 35% of a total a weight percentage of the reinforced plastic and a weight percentage of the polypropylene is 65% to 85% of the total weight percentage of the reinforced plastic. The following table shows characteristics of materials produced of polypropylene (PP) and glass fiber (GF) in different ratios.

TABLE 1

| Test items | Testing standard | Test condition | Unit | 85% PP + 15% GF | 80% PP + 20% GF | 75% PP + 25% GF | 65% PP + 35% GF |
|---|---|---|---|---|---|---|---|
| Tensile strength | ISO 527 | 10 mm/min | MPa | 52 | 66 | 80 | 95 |
| Tensile Strain at Break | ISO 527 | 10 mm/min | % | 5 | 5 | 5 | 5 |
| Flexural Strength | ISO 178 | 2 mm/min | MPa | 80 | 95 | 115 | 140 |
| Flexural Modulus | ISO 178 | 2 mm/min | MPa | 3000 | 4200 | 4700 | 6000 |
| Izod Notched Impact Strength | ISO 180 | Normal temperature 23° C. | kJ/m$^2$ | 12 | 13 | 13 | 17 |
| Density | ISO 1183 | — | g/cm$^3$ | 1.00 | 1.04 | 1.09 | 1.18 |
| Melt Flow Rate | ISO 1133 | 230° C./ 2.16 KG | g/10 min | 15 | 13 | 10 | 8 |

Example 2

A difference between Example 2 and Example 1 is that the reinforced plastic is a mixture of polyamide-6 (PA6) or polyamide-66 (PA66) and glass fiber (GF). The glass fiber is composed of continuous glass fiber and staple glass fiber, and a weight percentage of the glass fiber in the total weight percentage of the reinforced plastic is 15% to 35%, and a weight percentage of the polyamide-6 or polyamide-66 in the total weight percentage of the reinforced plastic is 65% to 85%. The following table shows the characteristics of materials produced by polyamide-6 (PA6) and glass fiber (GF) in different ratios.

TABLE 2

| Test items | Testing standard | Unit | Test condition | 85% PA6 + 15% GF | 70% PA6 + 30% GF | 50% PA6 + 50% GF |
|---|---|---|---|---|---|---|
| Tensile strength | ISO 527 | MPa | 10 mm/min | 130 | 170 | 205 |
| Tensile Strain at Break | ISO 527 | % | 10 mm/min | 3.4 | 3.2 | 2.2 |
| Flexural Strength | ISO 178 | MPa | 2 mm/min | 190 | 250 | 300 |

TABLE 2-continued

| Test items | Testing standard | Unit | Test condition | 85% PA6 + 15% GF | 70% PA6 + 30% GF | 50% PA6 + 50% GF |
|---|---|---|---|---|---|---|
| Flexural Modulus | ISO 178 | MPa | 2 mm/min | 5200 | 8200 | 12500 |
| Izod Notched Impact Strength | ISO 180 | kJ/m$^2$ | 23° C. | 8 | 16 | 20 |
| Density | ISO 1183 | g/cm3 | — | 1.23 | 1.36 | 1.55 |

Example 3

A difference between Example 3 and Example 1 is that the reinforced plastic is a mixture of acrylonitrile-butadiene-styrene copolymer (ABS) and polycarbonate (PC), a weight percentage of the polycarbonate is 30% to 40% of the total weight percentage of the reinforced plastic and a weight percentage of the acrylonitrile-butadiene-styrene copolymer is 60% to 70% of the total weight percentage of the reinforced plastic. The following table shows characteristics of materials produced by acrylonitrile butadiene styrene copolymer (ABS) and polycarbonate (PC) in different ratios.

TABLE 3

| Test items | Testing standard | Unit | Test condition | 70% ABS + 30% PC | 60% ABS + 40% PC | 40% ABS + 60% PC | 30% ABS + 70% PC |
|---|---|---|---|---|---|---|---|
| Tensile strength | ISO 527 | MPa | 50 mm/min | 50 | 51 | 53 | 55 |
| Flexural Strength | ISO 178 | MPa | 2 mm/min | 75 | 82 | 84 | 87 |
| Flexural modulus | ISO 178 | MPa | 2 mm/min | 2200 | 2300 | 2300 | 2300 |
| Charpy Notched Impact Strength | ISO 179/1eA | kJ/m$^2$ | 23° C. | 30 | 50 | 55 | 55 |
| Rockwell hardness | ISO 2039-2 | R-Scale | — | 105 | 110 | 120 | 125 |
| Density | ISO 1183 | g/cm$^3$ | — | 1.08 | 1.1 | 1.12 | 1.14 |

Example 4

A difference between Example 4 and Example 1 is that the reinforced plastic is acrylonitrile-butadiene-styrene copolymer.

Example 5

A difference between Example 5 and Example 1 is that the reinforced plastic is a mixture of polyolefin and reinforcing filler in a predetermined ratio, or polyamide and reinforcing filler mixed in a predetermined ratio. The reinforcing filler includes glass fiber, talc powder, calcium carbonate, barium sulfate, wollastonite, and whiskers. A weight percentage of the reinforcing filler is greater than or equal to 5%, and the bending strength of this reinforced plastic measured according to a bending performance testing method for plastics is greater than or equal to 25 Mpa; the notch impact strength of a cantilever beam measured according to an Izod impact strength testing method for plastics is greater than or equal to 3 KJ/m$^2$.

A manufacturing method for the integrated base 1, including the following sequential steps:

S1: mixing and heating the reinforced plastic according to proportions and performing a granulation treatment with a granulator to cause the reinforced plastic into granules;

S2: placing the metal reinforcement member 3 in a mould cavity of an injection die corresponding to the transverse beam 11, and then heating and melting plastic particles and injecting them into a locked injection die by an injection molding machine;

S3: after completing the injecting of the plastic particles, maintaining a pressure; S4: cooling the injection die to solidify a melt within the mould cavity of the injection die into the base 1;

S5: after cooling to room temperature, opening the injection die and demolding the base 1.

What is claimed is:

1. A walking/treadmill with an integrated base, comprising an integrated base, a running board, a running belt, a motor, an electric control, and a drum;

wherein the running board, the running belt, the motor, the electric control, and the drum are installed in the integrated base;

the base comprises a transverse beam, a longitudinal beam, and an installation cavity shell provided between the transverse beam and the longitudinal beam;

the longitudinal beam and the installation cavity shell are both made of reinforced plastic with a predetermined mixing ratio and are injection molded;

wherein the longitudinal beam is wrapped with a metal reinforcement member that is extended along a length direction of the longitudinal beam;

wherein the metal reinforcement member is provided with a plurality of through holes that are spaced along a length direction of the metal reinforcement member and penetrate a wall of the metal reinforcement member;

the metal reinforcement member is provided with a plurality of convex strips or protrusions that are concave inward from one side of the wall of the metal reinforcement member and convex outward from the other side thereof.

2. The walking/treadmill with an integrated base according to claim 1, wherein the reinforced plastic comprises polypropylene and glass fiber, or polyamide-6 and glass fiber, or polyamide-66 and glass fiber;

the glass fiber comprises continuous glass fiber and staple glass fiber.

3. The walking/treadmill with an integrated base according to claim 2, wherein the reinforced plastic with a predetermined mixing ratio refers to a weight percentage of the glass fiber is more than or equal to 15%, and the reinforced plastic has at least one of the following characteristics: a tensile strength of the reinforced plastic measured according to a tensile performance testing method for plastics is greater than or equal to 50 Mpa; a bending strength of the reinforced plastic measured according to a bending performance testing method for plastics is greater than or equal to 80 Mpa; a notch impact strength of a cantilever beam of the reinforced plastic measured according to an Izod impact strength testing method for plastics is greater than or equal to 8 KJ/m$^2$.

4. The walking/treadmill with an integrated base according to claim 1, wherein the reinforced plastic comprises polyolefin and reinforcing filler, or polyamide and reinforcing filler;
  wherein the reinforcing filler comprises one or more of a group of glass fiber, talc powder, calcium carbonate, barium sulfate, wollastonite, and whiskers.

5. The walking/treadmill with an integrated base according to claim 4, wherein the reinforced plastic with a predetermined mixing ratio refers to a weight percentage of the reinforcing filler is more than or equal to 5%, and
  the reinforced plastic has at least one of the following characteristics: a bending strength of the reinforced plastic measured according to a bending performance testing method for plastics is greater than or equal to 25 Mpa; a notch impact strength of a cantilever beam of the reinforced plastic measured according to an Izod impact strength testing method for plastics is greater than or equal to 3 KJ/m$^2$.

6. The walking/treadmill with an integrated base according to claim 1, wherein the reinforced plastic comprises acrylonitrile-butadiene-styrene copolymer, or acrylonitrile-butadiene-styrene copolymer and polycarbonate;
  wherein the reinforced plastic with a predetermined mixing ratio using a mixture of the acrylonitrile-butadiene-styrene copolymer and the polycarbonate refers to a weight proportion of the polycarbonate is more than or equal to 30%, and
  the reinforced plastic has at least one of the following characteristics: a tensile strength of the reinforced plastic measured according to a tensile performance testing method for plastics is greater than or equal to 50 Mpa, a bending strength of the reinforced plastic measured according to a bending performance testing method for plastics is greater than or equal to 70 Mpa; a charpy notch impact strength of the reinforced plastic measured according to an impact resistance testing method for plastics is greater than or equal to 30 KJ/m$^2$.

7. The walking/treadmill with an integrated base according to claim 1, wherein the longitudinal beam and the transverse beam are both provided with reinforcing ribs that are formed with the transverse beam and the longitudinal beam,
  wherein the longitudinal beam and the transverse beam are injection molded with the same reinforcing plastic.

8. A manufacturing method for the integrated base according to claim 1, comprising the following steps:
  S1: mixing and heating the reinforced plastic according to proportions and performing a granulation treatment with a granulator;
  S2: heating and melting plastic particles and injecting them into a locked injection die by an injection molding machine;
  S3: after completing the injecting of the plastic particles, maintaining a pressure;
  S4: cooling the injection die to solidify a melt within a mould cavity of the injection die into the base;
  S5: after cooling to room temperature, opening the injection die and demolding the base.

9. The manufacturing method for the integrated base according to claim 8, wherein in step S2, before injecting plastic particles into an injection die by an injection molding machine, the metal reinforcement member is placed in the mould cavity of the injection die corresponding to the transverse beam.

* * * * *